Feb. 7, 1967 J. L. KOZIKOWSKI 3,303,380

DIRECT COUPLED TRANSISTOR AMPLIFIER HAVING COMPLEMENTARY SYMMETRY OUTPUT AND SWITCHABLE FEEDBACK LOOP FOR DRIVING A DEFLECTION COIL

Filed Nov. 8, 1963

INVENTOR.
JOSEPH L. KOZIKOWSKI

BY Carl Fissell Jr.
AGENT

United States Patent Office 3,303,380

Patented Feb. 7, 1967

3,303,380

DIRECT COUPLED TRANSISTOR AMPLIFIER HAVING COMPLEMENTARY SYMMETRY OUTPUT AND SWITCHABLE FEEDBACK LOOP FOR DRIVING A DEFLECTION COIL

Joseph L. Kozikowski, Broomall, Pa., assignor to Burroughs Corporation, Detroit, Mich., a corporation of Michigan Filed Nov. 8, 1963, Ser. No. 322,448
5 Claims. (Cl. 315—27)

Figures 1, 2:
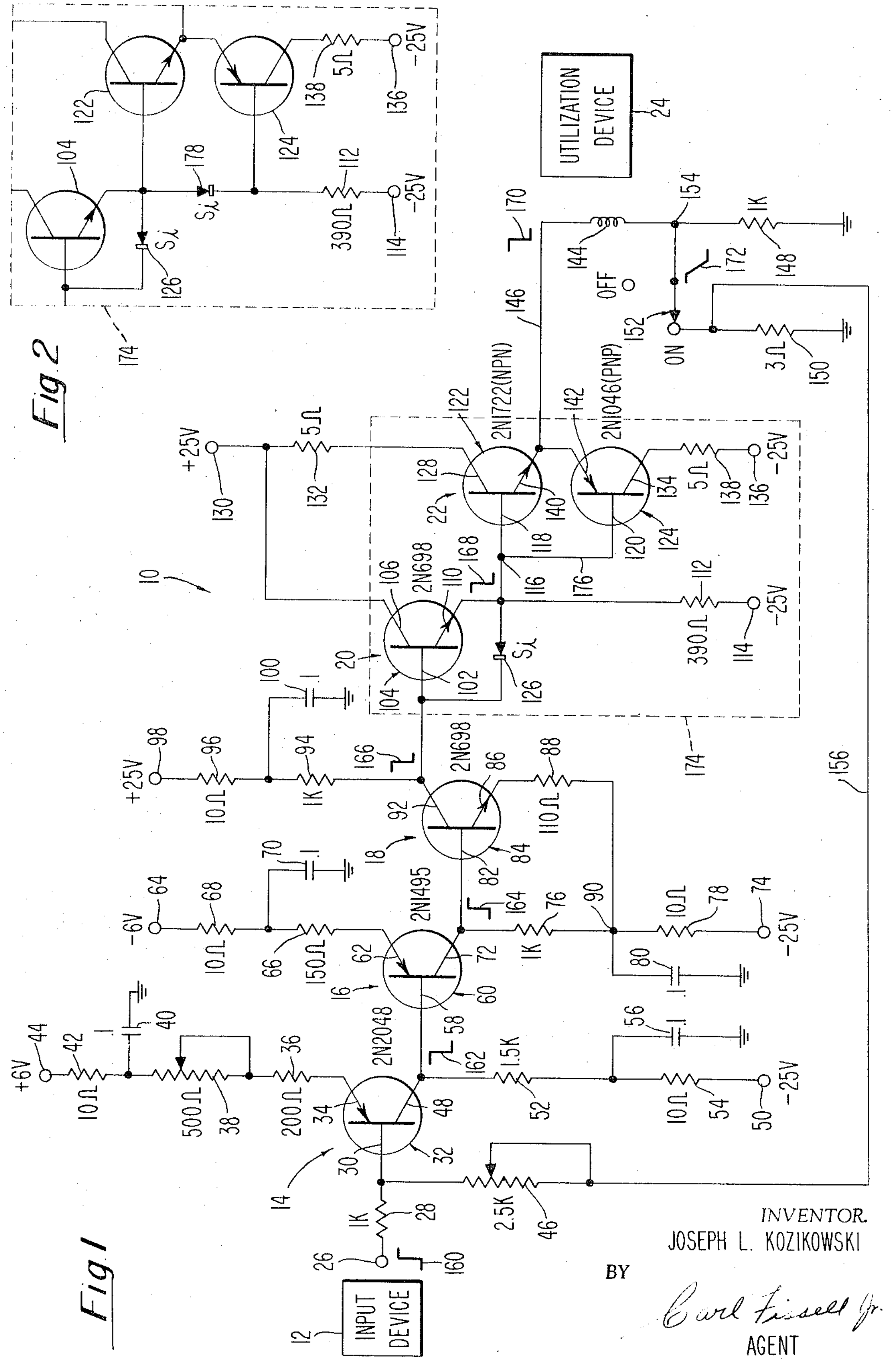

The present invention relates to solid state, e.g., transistor, amplifier apparatus, and more particularly, although not necessarily exclusively, to a multi-state composite direct coupled transistor amplifier utilizing a switchable feedback loop. With still more specificity, the invention has to do with a direct coupled transistor amplifier having a complementary symmetry type output for driving a relatively low impedance load or utilization device, e.g., the yoke coils of a cathode ray tube. Still more specifically, the invention has to do with a multi-stage direct coupled power amplifier employing negative feedback.

Cathode ray tube beam deflection is generally of two common types, i.e., electrostatic or magnetic. Electrostatic beam deflection requires high voltage circuitry which in and of itself is not readily adaptable to the use of solid state components such as transistors. A relatively high voltage power supply is required. This equipment is bulky, heat generating and power consuming. Also, high voltage requires extreme caution in service, repair and maintenance.

Magnetic beam deflection systems use vacuum tube circuit design. Such circuits are not suitable for random, high speed, beam deflection because of long settling times.

It is an important object, therefore, of the present invention to provide apparatus for overcoming the foregoing problems and shortcomings of conventional apparatus in a new and novel manner.

Another object of the invention is to provide apparatus which is inherently much smaller in size, produces relatively little heat output and wherein the power supply voltage requirements are extremely low.

Still another object of the invention is the provision of general purpose solid state amplifier circuitry wherein feedback means insures substantially linear operation, extremely good frequency response and high circuit stability.

It is also an object of the invention to provide amplifier apparatus wherein direct coupling permits completely random CRT beam deflection and operation to and including D.C. levels.

In accordance with the foregoing objects and first briefly described, the present invention comprises solid state amplifying apparatus including means for deflecting the beam of a cathode ray tube, multi-stage direct coupled power amplifier means having at least one stage thereof including a pair of push-pull output semiconductor devices, input and output terminal means, means connecting the output terminal of said push-pull stage to said deflection means, means for degeneratively feeding back to the first stage current signals having substantially the same wave shape as the deflecting current effective thereby to cause linear operation of said apparatus, switch means for selectively interrupting the feedback path to thereby establish a fixed bias in place thereof, and means for adjusting the overall gain of the apparatus.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIGURE 1 is a schematic circuit diagram of a signal amplifying circuit utilizing complementary symmetry solid state output stages and solid state driver stages embodying the present invention; and FIGURE 2 is a circuit diagram of a modification of a portion of the apparatus of FIGURE 1.

In electronic character generating apparatus, for example, it is desirable to be able to position the character or symbol at random, i.e., at any desired spot on the display device such as a cathode ray tube screen. The character or symbol may be located at the bottom, middle, or top, left or right, or at any other intermediate position or location chosen for the particular display. The system which produces the symbol or character must not only "coarse" locate the character on the screen of the tube, but must also have sufficient frequency response to clearly trace out (form) the character at the spot chosen for its display. Two deflection systems are required, one for horizontal and one for vertical beam deflection. In a system in which this apparatus is or may be employed, the signal input is a voltage, while the output signal is a current. The output load in this instance is or may be a yoke coil of a cathode ray tube. It is desirable to produce as linear a relationship as possible between the input voltage and the output current in the yoke since this type of apparatus involves relatively high currents and low impedances. The solid state design approach lends itself admirably to this type of circuit design.

Referring now to FIGURE 1, it is seen that the present invention is embodied in a circuit 10 operable as a multi-stage (e.g., five stages hereinafter more particularly identified) direct coupled transistor amplifier employing negative feedback. Input device 12 supplies, e.g., a voltage of desired frequency to first and second stages 14 and 16 which operate as common emitter amplifiers. PNP germanium transistors may be used in these two stages since they satisfy power and voltage requirements, exhibit good frequency response, and are less costly than silicon transistors.

The third stage 18, to which the first two stages are directly coupled, is also a common emitter amplifier, but uses a NPN transistor to regain a desirable D.C. voltage level. Silicon is used because of the voltage and power requirements. The fourth stage 20, directly coupled from stage three, is operated as an emitter follower which provides isolation between the third stage and the final (power) stage 22. Voltage and power requirements in stage 20 dictate the use of a NPN silicon transistor. The direct coupled fifth stage 22 is a complementary emitter-follower power stage using NPN and PNP power transistors, which in the present preferred embodiment function as the output driver stage more particularly described hereinafter to operate a utilization device 24 which is or may be a symbol or character display unit, e.g., cathode ray tube.

The source of input control voltage 12 is connectible in a suitable manner to an input terminal 26 for applying voltage of a desired sweep pattern to input resistor 28 for application to the base 30 of transistor 32 of the common emitter amplifier 14. Emitter current bias is supplied by connecting the emitter 34 via resistor 36, potentiometer 38, by-pass capacitor 40, and the resistor 42 to a six volt source of positive potential via terminal 44. Capacitor 40 and resistor 42 form a decoupling network for purposes to be explained hereinafter. Potentiometer 46 connected to base 30 of transistor 32 is part of a feedback circuit arrangement to be hereinafter described. The collector 48 of transistor 32 is biased by connection to a source 50 of negative potential —25 volts relative to ground through series connected resistors 52 and 54. Resistor 54 is bypassed to ground through a capacitor 56.

Collector 48 of the first amplifier stage 14, from which an amplified output is derived, is connected directly to the base 58 of transistor 60, of similar conductivity type as transistor 32, operating as a common emitter amplifier. The emitter 62 is biased negatively with respect to ground by connection to a −6 volt D.C. source 64, through series connected load resistors 66 and 68. Resistor 68 is bypassed to ground by capacitor 70, forming a decoupling network as above mentioned. Collector 72 is also biased negatively with respect to ground by connection to −25 volt source of potential 74 through series connected load resistors 76 and 78. Resistor 78 is bypassed to ground through capacitor 80.

The output of stage 16 via collector 72 is directly coupled to the base 82 of transistor 84 which operates as a common emitter amplifier. However, transistor 84 is of opposite conductivity type from transistors 32 and 60, i.e., NPN, and is of the silicon variety due to the voltage and power requirements of this stage. Emitter negative bias −25 volts is supplied by connection of the emitter 86 to source 74 through resistor 88, junction 90, and resistor 78. The collector 92 is positively biased by connection through the series load resistors 94 and 96 to the +25 volt source 98. Resistor 96 is bypassed to ground through capacitor 100.

The collector 92 of transistor 84 of stage 18 is connected directly to the base 102 of transistor 104 of amplifier stage 20, the latter stage acting as an emitter-follower. Collector 106 is biased positively by connection directly to source 130 of +25 volts D.C. Negative emitter bias is supplied by connecting the emitter 110 through a load resistor 112 to a −25 volt source of negative potential 114.

The emitter 110 of transistor 104 is connected in parallel via junction 116 to the bases 118 and 120 of transistors 122 and 124 of complementary emitter-follower power stage 22. The base 102 of transistor 104 is also connected through silicon diode 126 to the bases 118 and 120 via junction 116. Diode 126 is poled to prevent excessive reverse voltage across the base-emitter junction of transistor 104. Positive collector bias for transistor 122 is provided by connecting collector 128 to the +25 volt source 130 through voltage-dropping resistor 132. Negative bias for collector 134 of transistor 124 is supplied by connection to a −25 volt source 136 through voltage-dropping resistor 138. Emitters 140 and 142 are connected together and to the output load 144 over the common lead 146. The other end of inductance 144 is connected to ground via the resistor 148. The source of feedback potential earlier referred to herein is provided by means of sampling resistor 150, one end of which is grounded and the opposite end of which is connected to the inductance 144 through "on-off" switch 152 and the junction 154 between resistor 148 and inductance 144. Switch 152 is shown in the closed or "on" position. Feedback line or loop 156 connects one end of resistor 150 to the earlier mentioned feedback adjusting potentiometer 46.

In operation of the hereinbefore described apparatus, consider that the input 26 goes positive from ZERO volts. The negative case is similar except that there is a polarity reversal. The circuit of FIGURE 2 is considered to be in equilibrium with ZERO current in the yoke induction coil 144. Bias adjustment is produced by varying the emitter resistance of the first transistor 32. However, with the feedback loop 156 connected into the circuit, this is very difficult to do. In order to avoid any problems in this direction, switch 152, in series with the yoke coil 144, permits the feedback loop to be disconnected from the 3 ohm resistor 150 and connected to the 1K resistor 148, which goes directly to ground. In adjusting the biases, the voltage across the 1K resistor 148 is adjusted as close as possible to ZERO. The 500 ohm potentiometer 38 in the emitter leg of transistor 32 provides this adjustment since it is not in the feedback loop when switch 152 is open. It is initially adjusted so that with no signal into the apparatus there is ZERO current in yoke 144. That is to say that with all voltages applied to the circuit of FIGURE 1 and with the input device 12 at ZERO or ground potential, the 500 ohm potentiometer 38 is adjusted so that the current in the yoke is ZERO. Thereafter the feedback loop is switched in and the switch 152 remains in its on position. This adjustment should remain constant if properly arrived at, giving a properly oriented D.C. level thereafter.

The decoupling network, including resistor 42 and capacitor 40, in the emitter leg of transistor 32, prevents noise voltages on the various power supplies from entering the circuit and causing noise disturbance in the yoke current. Conversely, the decoupling network prevents excessive excursions in the current from causing noise in the power supplies which could disturb other circuits in the system. The transmission of noise in either direction is thus effectively eliminated. A similar decoupling network is provided in the emitter and collector legs of each of the transistors 32, 60 and 84 and for similar purposes.

First stage 14 is an inverting stage with gain. Thus, as the input goes positive, as shown by the positive spike or step of voltage 160, a current is produced in the resistor 28. The base current into base 30 causes the collector 48 to go in the negative direction as evidenced by the negative voltage level 162. This drives the collector 72 of the second inverting stage 16 positive going, see level 164, since base 58 of transistor 60 was driven negative for the previous stage. The third stage 18 also inverts so that its collector 92 goes negative, see level 166, since the base 82 of transistor 84 is also driven positive by the collector 48 of the previous stage. Thus it can be seen that a small voltage appearing on the base of transistor 32 provides a large excursion on the collector 92 of transistor 84 of stage 18, producing a negative output level 166.

Driver stage 20 acts as emitter-follower to transform the low impedance of the power stage into a high impedance which can be driven more easily by the inverter designated 18. The diode 126 of the base to emitter leg of stage 20 prevents excessively large reverse voltages from appearing across the emitter-base circuit thereby avoiding the possibility of destroying transistor 104 of stage 20.

Stage 22, including transistors 122 and 124—a complementary pair—operate as an emitter-follower and permit the output to be driven in both the positive as well as the negative direction. Thus during equilibrium or stand-by, both transistors have a very small or nominal current flowing through them—in the complementary configuration—making the stage much more efficient from the standpoint of power consumption than a single class A emitter-follower. The 5 ohm resistors 132, 138 in the collector legs 128, 134 of the output transistors 122 and 124, respectively, reduce collector to emitter voltage when either transistor is conducting current. This further reduces the power consumed by the transistors and in this manner prevents destruction of these units by accidental overload. These resistors, of course, cannot be too large in value or they drop too much of the supply voltage. In such case the transistors will saturate and cause the current through the yoke 144 to distort. Driver stage 20 and the complementary output stage 22 do not invert the signal 168 so that the signal level 170 across the yoke 144 has the same polarity as the signal coming from the driver stage which is negative for a positive input at terminal 26. Thus, as the input goes positive, the voltage across the yoke 144 goes negative.

In the normal operation, the switch 152 is "on" to place the 3 ohm resistor 150 in circuit as a sampler. The majority of the yoke current then passes through the 3 ohms and only a very small current is permitted to pass through the 1000 ohm resistor 148 to ground. The 3 ohm resistor acts in the nature of a sampling resistor. It generates a voltage which is proportional to the yoke current. Thus, as the voltage goes positive across the yoke 144, the current increases in linear fashion thereby causing the voltage across the 3 ohm resistor to increase positively in a linear fashion.

If the input at terminal 26 goes positive and stays positive, the voltage level 170 at inductor 144 goes negative. The current also begins to go negative, however, at a slower rate because of the current lag or inability of the current in the yoke inductance to change rapidly with the change in voltage. This negative going current produces a negative voltage wave 172 decreasing in a substantially linear manner across the 3 ohm resistor 150 which is applied to the 2½K feedback potentiometer 46. This will produce a negative current at the base 30 of the first transistor 32. When this current in the yoke 144 has built up to a value such that the voltage across the 3 ohm resistor 150 produces a feedback current which exactly cancels the current from the input device 12, the yoke current will stop increasing and maintain its value. Gain control is provided by variable resistor 46. Thus, for example, if this resistance is set at 1000 ohms, then 3 volts at the input 26 will provide 1 ampere of current at yoke 144.

This is a negative feedback amplifier which maintains the yoke current at some value proportional to the input voltage. Because of the high degree of feedback, there is very little drift. The proportionality between the input voltage and the yoke current is extremely constant. This provides linear operation for the entire operating range of yoke currents.

Due to the fact that there is a base to emitter drop appearing in each of the transistors 122 and 124 of the output stage 22, when the circuit is changing from one polarity to another, as it goes through ZERO volts, there is a dead band or region of voltage wherein the output does not change even though the input at the bases 118 and 120 of the complementary pair is changing. This produces a certain amount of so-called "cross-over" distortion.

The modification set forth in FIGURE 2 is a circuit change which substantially eliminates such cross-over distortion. The dead band region above referred to originates when the base voltage is approximately .7 volt positive and terminates approximately at a .25 volt negative. 7/10 of a volt is sufficient to make the NPN transistor conduct and .25 volt is sufficient to make the PNP transistor conduct. In between those voltages neither transistor conducts, so both devices might have some activity occurring near ZERO even though the output does not change. This effect is a function of how much gain there is in the amplifier. The total excursion—this dead band region—is approximately 1 volt. The effect on the yoke 144 is minimized by the total gain of the amplifier. Effectively, this is tantamount to dividing the gain of the amplifier into 1 volt. Thus, if the gain were 1000, this would produce a 1 millivolt dead band on the yoke 144. This could be objectionable particularly in character generation equipment such as displays wherein a symbol to be displayed represents a very small part of the total screen dimension. For example, suppose it is desired to display a character directly in the center of the screen. It quite possibly would be distorted since the character was being drawn along the horizontal and vertical center lines of the device.

In the past this effect has been partially neutralized by employing a resistor across the bases of the complementary pair and depending upon the current through the resistor to maintain a bias in order to keep the two transistors slightly conducting at all times. A disadvantage of this arrangement is that the bias produced by the resistor is a function of the voltage across it while the voltage is a function of the current through it. This current changes as the voltage at the emitter 110 of the driver stage 20 varies for different levels of yoke current. Thus there would not be a constant bias appearing across the two bases 118 and 120 of the output pair.

The circuit of FIGURE 2, which includes each of the components within the dotted outline 174 of FIGURE 1, illustrates the circuit modification which solves the foregoing problem in a new and novel manner. The line 176 connecting the bases 118 and 120 of the two output transistors is eliminated. A silicon diode 178 is interposed between the two bases 118 and 120. The base 118 is connected to the anode of a silicon diode 178 while the base 120 is connected to the cathode of the diode effectively interposing the diode 178 in the emitter leg of transistor 104.

The diode 178 makes the bias practically constant since its voltage varies only slightly, e.g., from approximately .8 volt to about 1 volt for the different current levels encountered in such a circuit as this one. The diode acts very nearly as a battery. This provides a degree of offset between the two bases which substantially eliminates any cross-over distortion which might tend to assert itself in the circuit.

The amplifier design incorporating the present invention has a forward gain of approximately 40 db. The gain and phase margins are 6 db and 40° respectively. The present circuit has been used to drive an 80 microhenry yoke with a radial deflection current of 2.0 amperes. Full radial deflection to within 1% of final value can be obtained in 10 microseconds or less, depending upon beam stiffness and intensity. With heat sinks with 20° C./watt thermal resistance mounted to the power transistors 122 and 124 of the output stage 22, current drift in the yoke 144 is less than 20 milliamperes in the range 20° C. to 50° C.

What is claimed is:

1. A multistage direct coupled transistor amplifier for supplying current to the deflection coil of a cathode ray tube comprising (a) a transistor output stage including a pair of first and second transistors of opposite conductivity having their emitter electrodes interconnected and adapted to be connected to one end of said deflection coil, (b) at least one transistor input stage coupled to the base electrodes of said first and second transistors, and (c) a unidirectional circuit means connected between said base electrodes for applying a difference in potential between said base electrodes which is greater than the sum of the forward-biasing base-emitter voltages of said first and second transistors.

2. A multistage direct coupled transistor amplifier for supplying current to the deflection coil of a cathode ray tube comprising (a) a transistor output stage including a pair of first and second transistors of opposite conductivity having their emitter electrodes interconnected and adapted to be connected to one end of said deflection coil, (b) at least one transistor input stage coupled to the base electrodes of said first and second transistors, (c) a unidirectional circuit element connected between said base electrodes and having a forward voltage drop which is greater than the sum of the forward-biasing base-emitter voltages of said first and second transistors, (d) first impedance means connected between the other end of said deflection coil and a point of reference potential in series therewith for sampling the current flowing out of said deflection coil and developing a voltage therefrom, and (e) second impedance means connected between said other end of said deflection coil and an input terminal of the transistor of the first input stage for degeneratively feeding said voltage back to said input terminal.

3. A multistage direct coupled transistor amplifier according to claim 2 characterized further by the provision of means for directly coupling said emitter electrodes to said one end of said deflection coil.

4. A multistage direct coupled transistor amplifier according to claim 3 characterized further by the provision of (a) third impedance means connected between said other end of said deflection coil and said point of reference potential, (b) switch means for selectively disconnecting the junction of said third impedance means and said deflection coil from the junction of said first and second impedance means, and (c) means for adjusting the bias on the emitter electrode of the transistor of said first input stage when said junctions are disconnected to place the junction of said third impedance means and said deflection coil at said reference potential when said input terminal is at said reference potential.

5. A direct coupled transistor amplifier comprising (a) input signal apparatus, (b) an input terminal adapted to receive control signals from said signal apparatus, (c) an inductive, high current, low impedance load for deflecting the beam of a cathode ray tube, (d) first and second amplifier stages each including a PNP transistor, the collector of said first stage being connected to the base of said second stage in a signal inverting circuit arrangement, (e) a resistor connecting said input terminal to the base of said first transistor, (f) third and fourth amplifier stages each including an NPN transistor, the collector of said second stage being connected to the base of said third stage in a signal inverting circuit arrangement and the collector of said third stage being connected to the base of said fourth stage in a noninverting signal circuit arrangement, (g) a first unidirectional circuit element connected between the base and emitter of said fourth stage transistor and poled to prevent excessive reverse voltage across the base-emitter junction of said fourth stage transistor, (h) an output stage including a complementary pair of NPN and PNP transistors having their emitters interconnected and adapted to be directly coupled to said load, the base of one of said complementary transistors being connected to the emitter of said fourth stage transistor and to said first unidirectional circuit element, (i) a second unidirectional circuit element connected between the bases of said complementary transistors and having a forward voltage drop which is greater than the sum of the forward-biasing base emitter voltages of said complementary transistors so as to prevent cross over distortion as the current through said load passes through zero, both of said complementary transistors being conductive at the point where said current through said load passes through zero, (j) switch means connected in a degenerative feedback arrangement between said load and said first stage transistor and including a fixed resistor between said load and ground and a variable resistor between said load and the base of said first transistor, said switch means being effective in one position to remove the feedback from the circuit and in another position to conduct a feedback current which exactly cancels the input current so that the current through said load maintains a substantially fixed value proportional to the input voltage, thereby providing a controlled drive for said load and preventing excessive flyback voltage, (k) D.C. bias adjustment means including a variable resistor in the emitter circuit of said first stage transistor for adjusting the bias to place the output terminal at the same potential as said input terminal when no feedback is applied to the circuit, and (l) a decoupling network including a resistor and a capacitor in each of the collector and emitter circuits of the first three amplifier stages effective to prevent noise voltages from the applied potentials from creating noise disturbances affecting the load current.

References Cited by the Examiner

UNITED STATES PATENTS

| | | | |
|---|---|---|---|
| 2,964,673 | 10/1960 | Stanley | 315—26 |
| 3,053,997 | 9/1962 | Cobbold | 307—88.5 |
| 3,096,487 | 7/1963 | Lee | 330—17 |

OTHER REFERENCES

Proceedings of the IRE, October 1959, p. 57A.

DAVID G. REDINBAUGH, *Primary Examiner.*

ROBERT L. GRIFFIN, *Examiner.*

T. A. GALLAGHER, *Assistant Examiner.*